United States Patent [19]

Qian et al.

[11] Patent Number: 5,909,824

[45] Date of Patent: Jun. 8, 1999

[54] PROCESS AND DEVICE FOR PRESERVING CARBONATION OF CARBONATED BEVERAGE DURING CONSUMPTION

[76] Inventors: Zide Qian; Benyu Qian, both of 4750 E. Templeton St., Unit 1210, Los Angeles, Calif. 90032

[21] Appl. No.: 09/099,846

[22] Filed: Jun. 19, 1998

Related U.S. Application Data

[63] Continuation-in-part of application No. 08/500,394, Jul. 10, 1995, abandoned.

[51] Int. Cl.$^6$ .................................................. G01F 11/28
[52] U.S. Cl. .................................................. 222/1; 222/450
[58] Field of Search ................... 222/1, 425, 450–453; 141/322, 364

[56] References Cited

U.S. PATENT DOCUMENTS

| | | | |
|---|---|---|---|
| 345,112 | 7/1886 | Canan | 222/450 |
| 652,992 | 7/1900 | Arnold | 222/450 |
| 1,223,207 | 4/1917 | Scypinski | 222/450 |
| 2,356,755 | 8/1944 | Fazekas | 141/322 |
| 2,985,343 | 5/1961 | Mask | 222/450 X |
| 3,005,578 | 10/1961 | Mainieri | 222/450 |
| 3,237,816 | 3/1966 | Anderson | 222/450 |
| 4,005,807 | 2/1977 | Wiesner | 222/450 X |
| 4,105,142 | 8/1978 | Morris, Jr. | 222/158 |
| 4,313,477 | 2/1982 | Sebalos | 141/364 X |
| 4,723,670 | 2/1988 | Robinson et al. | 215/228 |
| 4,860,932 | 8/1989 | Nagy | 222/402 |
| 4,932,544 | 6/1990 | Giazer | 215/226 |
| 5,025,953 | 6/1991 | Doundoulakis | 222/23 |
| 5,635,232 | 6/1997 | Wallace | 426/397 |

*Primary Examiner*—Kevin P. Shaver

[57] ABSTRACT

The present invention relates to a process for preserving carbonation of carbonated beverage during consumption from a carbonated beverage containing bottle, which has a relatively large amount of carbonated beverage therein and a bottle head with a bottle opening. A device including an airtight closed container having a volume smaller than the carbonated beverage containing bottle, which one end is provided with a connecting sleeve and another end provides with a sealing mechanism for selectively sealedly and airtightly closing the airtight closed container. An adapter is connected to the bottle head of the carbonated beverage containing bottle and the airtight closed container in an airtight manner, for selectively closing the bottle opening of the carbonated beverage containing bottle from an interior of the airtight closed container in an airtight manner and opening the bottle opening of the carbonated beverage containing bottle to enable an amount of carbonated beverage equal to or less than the capacity of the airtight closed container inside the carbonated beverage containing bottle to be poured into the airtight closed container without losing the carbonation.

21 Claims, 15 Drawing Sheets

PROCESS AND DEVICE FOR PRESERVING CARBONATION OF CARBONATED BEVERAGE DURING CONSUMPTION

CROSS REFERENCE RELATED TO THE PRESENT INVENTION

This application is a continuation-in-part of an original application, Ser. No. 08/500,394, filed on Jul. 10, 1995 now abandoned.

BACKGROUND OF THE PRESENT INVENTION

This application relates to a process and device for preserving carbonation of carbonated beverage during consumption. According to the present invention, when a user dispenses the carbonated beverage in a bottle or other similar container, the gaseous carbon dioxide content in the carbonated beverage can be preserved from leakage or escaping to the surrounding atmosphere.

Various kinds of carbonated beverage, such as "COCA COLA", "PEPSI", and "7-UP", are the most common and popular beverages nowadays. The compressed carbon dioxide in carbonated beverage provides a familiar feeling to thirsty consumers. Carbonated beverage is generally on sale in container such as an airtight can or bottle package for the preservation of compressed carbon dioxide.

The most popular capacities of the bottled carbonated beverage are 1.2 liter, two liters and even three liters. It is because the large capacity of the bottle package is relatively cheaper in price and beneficial to environmental protection. Most family and company consumers purchase the bottled carbonated beverage and reserve in refrigerator. However, all the current containers of the carbonated beverage bare serious shortcomings described hereafter.

For canned carbonated beverage, the consumer has to finish the whole can immediately, otherwise all the compressed carbon dioxide in the remainder will escape to the atmosphere after a while, and that the remaining beverage will become flat.

For bottled carbonated beverage having a capacity more than a liter, if the consumer cannot finish the whole bottle of carbonated beverage immediately after it is opened, no matter how tightly the cap being rescrewed to the bottle, the remaining carbonated beverage will gradually lose its carbonation due to the loss of gaseous carbon dioxide from within the bottle container and more specifically, inside the space right above the surface of the beverage when the cap is opened every time to pour out the beverage, thus the remaining beverage in the bottle will become flat soon.

In fact, there has long been the market need to preserve carbonation during the consumption of a large bottle of carbonated beverage such as soda beverage ever since its appearance on the market in the 1970's. As a matter of fact, there have been 5 U.S. patents issued after 1979 to inventions aiming to or advertised to preserve carbonation during the dispensing of bottled carbonated beverages. They are U.S. Pat. Nos. 4,723,670, 4,860,932, 4,932,544, 5,635,232 and 5,025,953.

The U.S. Pat. No. 4,723,670 (Trade Name: Fizz Keeper) simply pumps atmospheric air into the bottle after each regular opening and dispensing, but the problem is that atmospheric air contains very little percentage of carbon dioxide. One can pump a lot of air into the bottle and make the bottle very hard and that may lead people to feel the beverage in t he bottle is very well carbonated. But, as a matter of fact, it is not much different from not using this pump at all, because regular air doesn't help. Actually, it has only applied the regular mechanism of a regular bicycle tire pump to the new objective-preservation of carbonation during the dispensing of bottled carbonated beverages, unsuccessfully albeit.

The U.S. Pat. No. 4,860,932 (Trade Name: Soda Matic) uses a pipe inserted into the bottle and utilizes the pressure inside the bottle to push the beverage out through the pipe. Eventually the beverage jets out from the nozzle and into a cup and generates huge amount of bubbles. However, after all the bubbles are gone, the dispensed beverage inside the cup is almost dead flat which is even worse than not using this device.

The U.S. Pat. No. 4,932,544 (Trade Name: Soda Saver) uses a latch to cap the bottle. It may be easy to open the bottle by simply squeezing the handles, but other than that, it is not different from not using such a device at all.

The U.S. Pat. No. 5,635,232 simply adds external carbon dioxide source into the carbonated beverage container.

The U.S. Pat. No. 5,025,953 is a more involved art. It basically tries to minimize the space inside a carbonated beverage bottle after each dispensation. But it is too mechanically complicated to use and unpractical to commercialize.

On the other hand, the U.S. Pat. No. 4,105,142 and other cited prior arts basically disclose typical liquid dispensers for dispensing predetermined quantity of liquid at one time. However, no liquid dispenser in the art can preserve the carbonation or carbon dioxide content especially during the consumption of a carbonated beverage such as soda beverage in a bottle.

In view of the above cited prior arts, they all share the following commonalties:

(1) Dispense liquid from a source container to a secondary container with predetermined capacity.
(2) Close the connection between the source container and the secondary container.
(3) Further dispense from the secondary container.

In other words, they all serve the purpose of dispensing a certain quantity of liquid in a quick and accurate way only. None of them discovered or had the object or effect of trapping the highly pressured gases from within the source container during the whole process of dispensing. Their specifications and claims all fail to suggest, mention, imply, or allude to any purpose or effect of preserving carbonation of the beverage or keeping any kind of highly pressured gas inside the source container from escaping to the outside environment during dispensing.

Each and every one of the above arts certainly is adapted to dispense any liquid, including carbonated soda beverages. But none of them has provided or specified an explicit and secured high-pressure resistant airtight sealing mechanism such as an O-ring associated with a gland structure, for the purpose of keeping the highly pressured contents inside the source container from escaping to the outside. The highly pressured (about 5 atm) contents involved herewith are: highly pressured gaseous carbon dioxide, the soda beverage, and the considerable amount of dissolved carbon dioxide that it contains. The lack of such an explicit and secured high-pressure resistant airtight sealing mechanism has made it physically impossible to trap the highly pressured contents inside a soda bottle, hence unfit to serve the purpose of preserving carbonation, even though one can still insist on using them upon carbonated beverages without the effect of saving the carbonation.

SUMMARY OF THE PRESENT INVENTION

The main object of the present invention is to provide a process and device for preserving carbonation of carbonated beverage during consumption, which is far more superior than any one of the prior arts in preserving the carbonation without the adding of carbon dioxide from some external sources.

Another object of the present invention is to provide a device for preserving carbonation of carbonated beverage during consumption, which defines an airtight closed chamber affixed to the bottle head of a newly opened airtight bottle of carbonated beverage in an airtight manner. The airtight closed chamber provides an isobaric environment, so that the compressed carbon dioxide in the carbonated beverage can be prevented from escaping or leaking out to the surrounding atmosphere.

Another object of the present invention is to provide a device for preserving carbonation of carbonated beverage during consumption, wherein the number of times of dispensation has virtually no effect on the preservation of carbonation, since the dispensation of the carbonated beverage is carried out into the airtight closed chamber, the gaseous carbon dioxide can be prevented from escaping to the surrounding atmosphere. It is fundamental to the preservation of carbonation since the amount of dissolved carbon dioxide kept within the carbonated beverage is determined by the partial pressure of the gaseous carbon dioxide in the space right above the carbonated beverage in the bottle. Thus the present invention can conserve the compressed carbon dioxide content of the carbonated beverage during consumption.

Another object of the present invention is to provide a device for preserving carbonation of carbonated beverage during consumption, wherein the dispensation is under the same pressure between the bottle and the airtight closed chamber, hence there is no ejection or vigorous foaming during the dispensing process, so that the dissolved carbon dioxide content within the portion of the carbonated beverage being dispensed can be kept in there after dispensation.

Another object of the present invention is to provide a device for preserving carbonation of carbonated beverage during consumption, wherein an amount of air which occupies the airtight closed chamber is exchanged with the portion of liquid that is being dispensed, hence the total pressure in the bottle after dispensation is not reduced to an otherwise greater extent due to the let out of a portion of liquid.

Another object of the present invention is to provide a device for preserving carbonation of carbonated beverage during consumption, wherein the quantity of carbonated beverage dispensed can be arbitrary depending upon the capacity of the airtight closed chamber, hence the carbonated beverage can be consumed in a very economic way while the carbonation of the carbonated beverage is well preserved.

DETAILED DESCRIPTION OF THE PREFERRED EMBODIMENT

Figure 1:
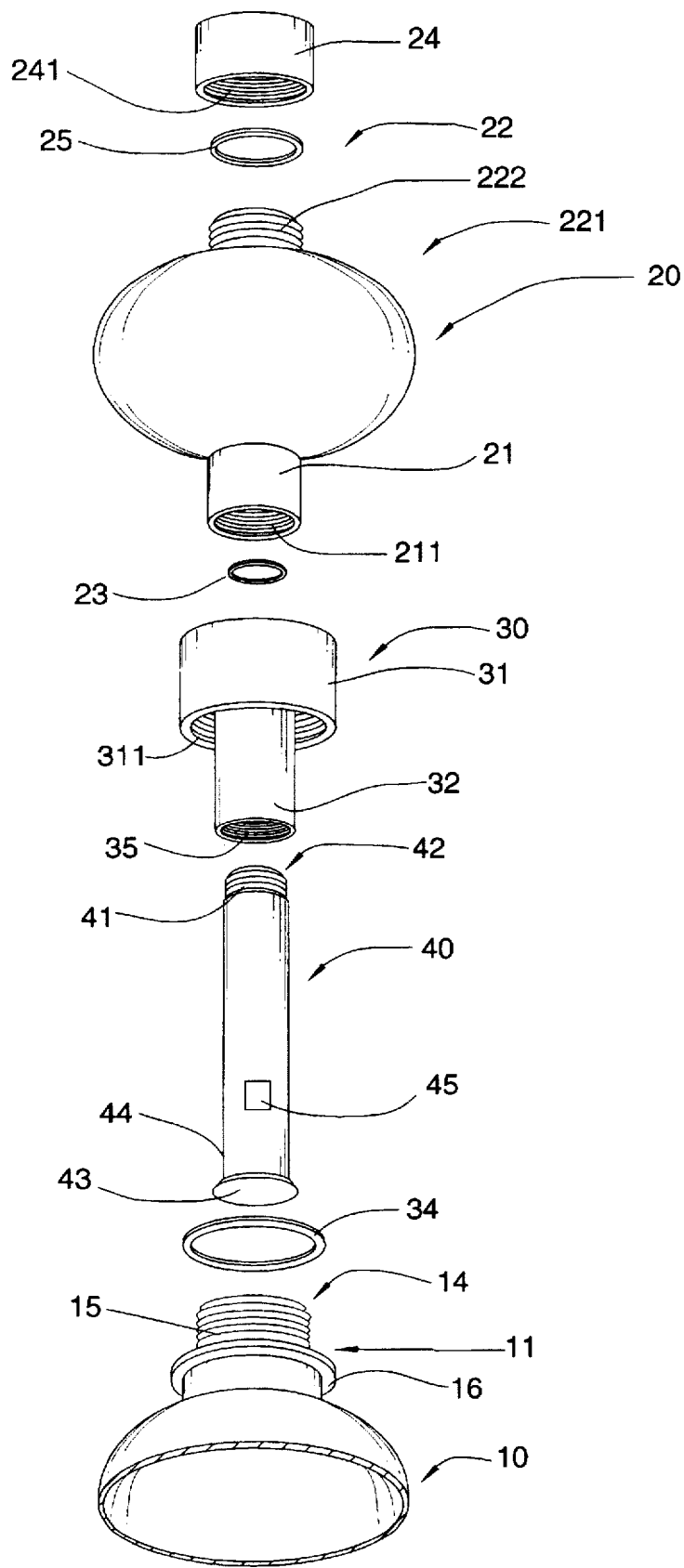
FIG. 1 is an exploded perspective view of a device for preserving carbonation of carbonated beverage during consumption according to a first preferred embodiment of the present invention.
Figure 2:
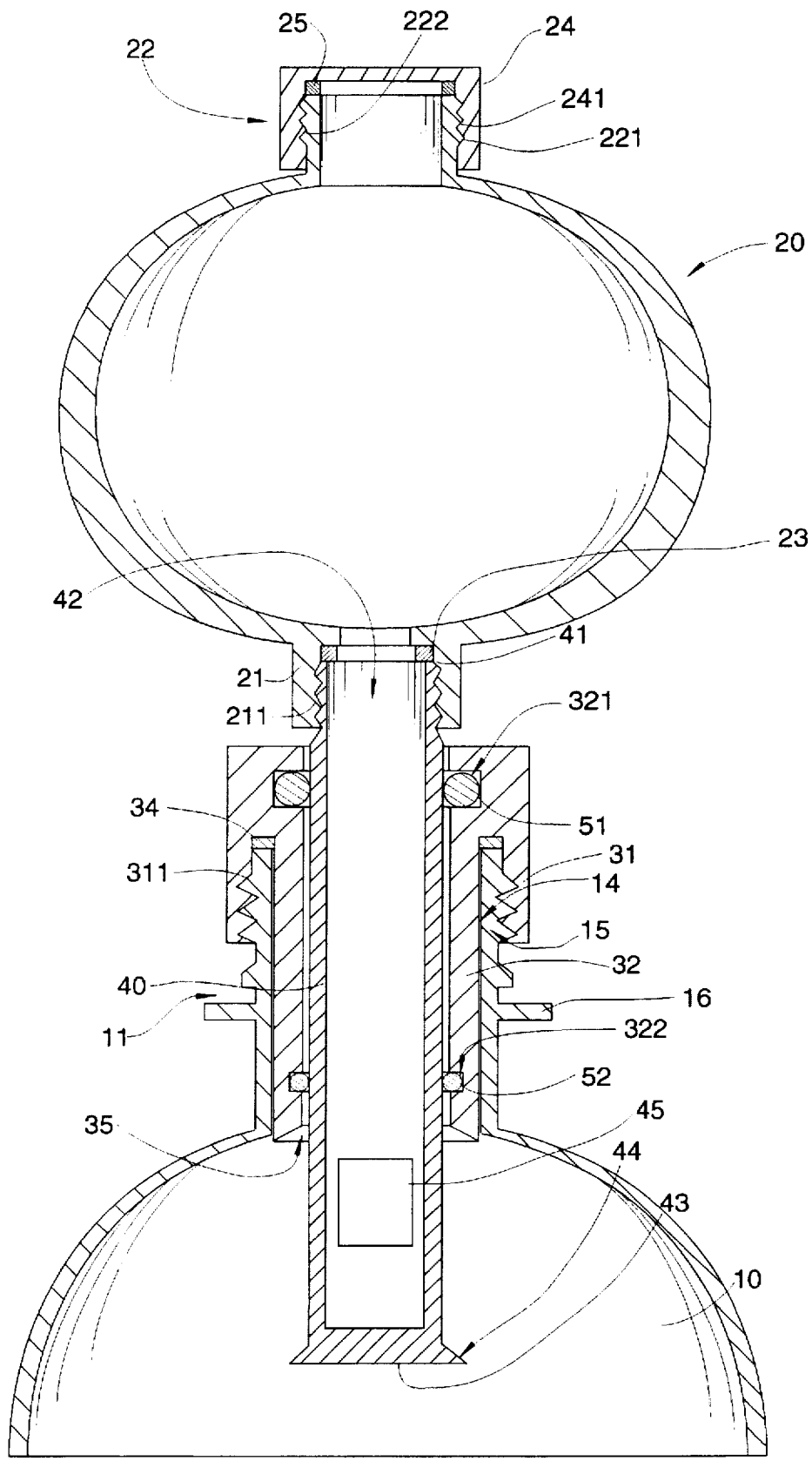
FIG. 2 is a sectional view of the device for preserving carbonation of carbonated beverage during consumption, in opened position, according to the above first preferred embodiment of the present invention.
Figure 3:
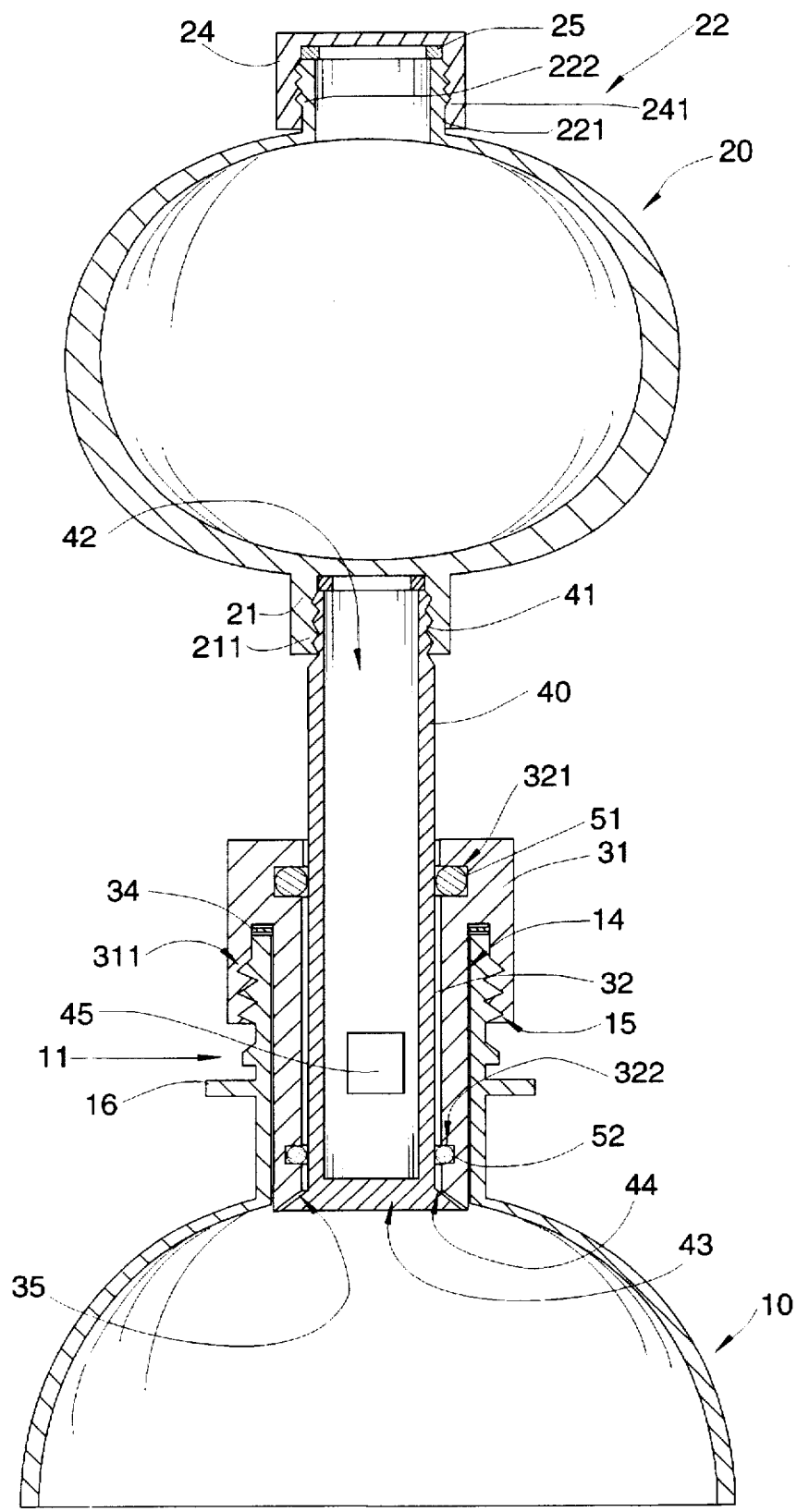
FIG. 3 is a sectional view of the device for preserving carbonation of carbonated beverage during consumption, in closed position, according to the first preferred embodiment of the present invention.
Figure 4:
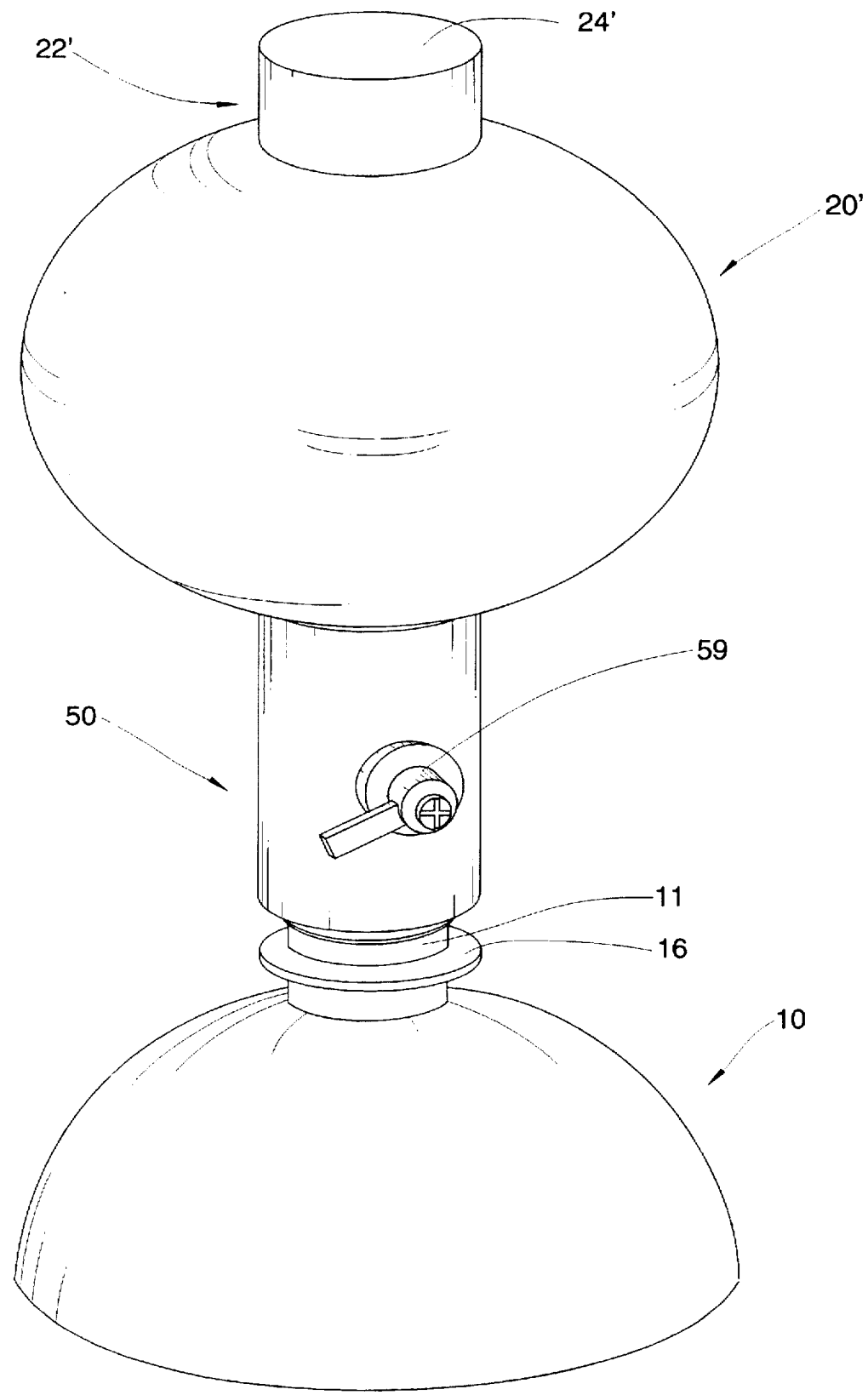
FIG. 4 is a perspective view of a device for preserving carbonation of carbonated beverage during consumption which is mounted on a carbonated beverage bottle in an airtight manner according to a second preferred embodiment of the present invention.
Figure 5:
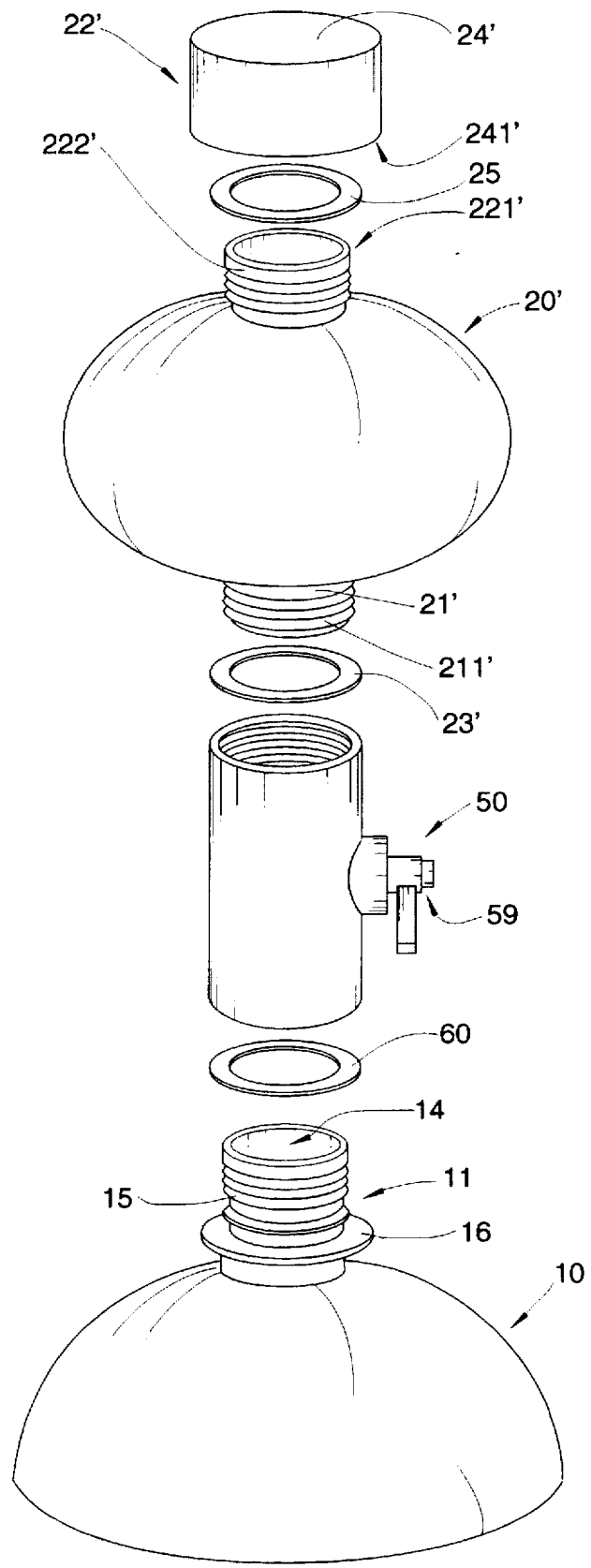
FIG. 5 is an exploded perspective view of the device for preserving carbonation of carbonated beverage during consumption according to the above second preferred embodiment of the present invention.

Referring to FIGS. 1 to 3 of the drawings, a device for preserving carbonation of carbonated beverage during consumption according to a first preferred embodiment of the present invention is illustrated, which is associated with a carbonated beverage containing bottle 10 which has a bottle head 11 having a bottle opening 14, an outer thread portion 15 and a periphery rim 16 radically protruded below the outer thread portion 15.

The device for preserving carbonation of carbonated beverage during consumption of the first embodiment of the present invention comprises an airtight closed container 20 and an adapter means connected to the bottle head 11 of the carbonated beverage containing bottle 10 in an airtight manner for selectively closing the bottle opening 14 of the carbonated beverage containing bottle 10 from an interior of the airtight closed container 20 in an airtight manner or opening the bottle opening 14 of the carbonated beverage containing bottle 10 to enable the carbonated beverage inside the carbonated beverage containing bottle 10 to flow into the airtight closed container 20.

According to the first preferred embodiment, the adapter means comprises a connecting mean 30, and a conducting pipe 40, wherein the airtight closed container 20 is affixed to the capped bottle opening 14 of the carbonated beverage containing airtight manner by means of the connecting mean 30 and the conducting pipe 40.

The conducting pipe 40 which is a round hollow tube has a top threaded end 41, a top opening 42, an enlarged closed bottom end 43 having tapered shoulder 44 formed therearound for sealing off the bottle opening 14 when the conducting pipe 40 is in a closed position, and an orifice 45 formed at a lower portion of the conducting pipe 40 for outleting the beverage inside the carbonated beverage containing bottle 10.

The airtight closed container 20 which is a ball shape container has a bottom end providing a connecting sleeve 21 having an inner threaded portion 211 and a top end providing a sealing means 22. A first sealing gasket 23 is positioned inside the connecting sleeve 21. The connecting sleeve 21 is connected with the top thread end 41 of the conducting pipe 40 in an airtight manner by screwing the top thread end 41 of the conducting pipe 40 with the inner threaded portion 211 of the connecting sleeve 21 until the top thread end 41 is tightly pressed against the first sealing gasket 23. The sealing means 22 comprises an outlet 221 which has an outer thread portion 222 provide thereon, a seal cap 24 with an inner thread portion 241 and a second sealing gasket 25 positioned inside the seal cap 24. By screwing the sealing cap 24 to the outer thread portion 222 of the outlet 23 until the tip edge of the outlet 221 pressing against the second sealing gasket 23 would make the sealing mean 22 tightly sealing the interior chamber of the airtight closed container 20 from the outside environment.

The connecting mean 30 comprises an outer holding ring 31 and an inner extended tube 32 which top end is integrally connected with a top end of the outer holding ring 31 to form a one piece body, so that a receiving ring groove 33 is defined between an inner wall of the outer holding ring 31 and the outer wall of the inner extended tube 32. The inner wall of the outer holding ring 31 is provided with a threaded portion 311. A third sealing gasket 34 is positioned inside the receiving ring groove 33. The inner extended tube 32, as shown in FIGS. 2 and 3, has an upper portion forming an upper circular groove 321 to fittingly receive a first O-ring 51, a lower portion additionally forming a lower circular groove 322 to fittingly receive a second O-ring 52, and a bottom tapered end shoulder 35 which enables the tapered shoulder 44 of the conducting pipe 40 to sit thereon so as to close the conducting pipe 40.

The conducting pipe 40 is fittingly inserted through the inner extended tube 32 which has a length longer than that of the outer holding ring 31 but shorter than that of the conducting pipe 40, wherein the first and second O-rings 51, 52 are respectively pressed against an outer wall of the conducting pipe 40. As shown in FIG. 3, during a closed position, the orifice 45 on the conducting pipe 40 is positioned between the first and the second O-rings 51, 52 to ensure an airtight connection between the conducting pipe 40 and the inner extended tube 32 while enabling the conducting pipe 40 to slide up and down.

The present invention can be easily connected to the carbonated beverage containing bottle 10 by simply inserting the bottle head 11 into the receiving ring groove 33 and screwing the outer thread portion 15 of the bottle head 11 with the threaded portion 311 of the outer holding ring 31 until the top end of the bottle head 11 is pressed against the third sealing gasket 34 to achieve an airtight connection. At the same time, the inner extended tube 32 is inserted into the bottle head 11 so that the connecting means 30 is firmly and sealedly mounted on the bottle head 11 of the carbonated beverage containing bottle 10.

Referring to FIGS. 3, normally the conducting pipe 40 is pulled upwards to a closed position, wherein the tapered shoulder 44 thereof is pressed against the tapered end shoulder 35 of the inner extended tube 32, so that the carbonated beverage containing bottle 10 is closed. Moreover, the third sealing gasket 34, the first O-ring 51 and the second O-ring 52 render the interior of the carbonated beverage containing bottle 10 entirely airtight from the outside surrounding so that no carbonation or carbon dioxide in the carbonated beverage within the carbonated beverage containing bottle 10 will escaped outside and be preserved inside the carbonated beverage containing bottle 10.

Referring to FIG. 2, in order to dispense the carbonated beverage inside the carbonated beverage containing bottle 10, simply turn the carbonated beverage containing bottle 10 up side down and push the conducting pipe 40 downwards until the orifice 45 is extended to position inside the carbonated beverage containing bottle 10. Then the present invention is adjusted to an opened position, so that the carbonated beverage inside the carbonated beverage containing bottle 10 can flow into the airtight closed container 20 and fill it up through the orifice 45. Once the amount of the carbonated beverage desired is fulfilled or the airtight closed container 20 is filled up, the user has to pull up the airtight closed container 20 together with the conducting pipe 40 upwards out of the carbonated beverage containing bottle 10 until the tapered shoulder 44 of the conducting pipe 40 is pressed against the tapered end shoulder 35 of the inner extended tube 32, so that the carbonated beverage containing bottle 10 is re-operated to the closed position again so as to preserve the carbonation or carbon dioxide within the carbonated beverage that remains in the carbonated beverage containing bottle 10.

Turn the carbonated beverage containing bottle 10 back to the upright position. By opening the sealing cap 24 of the airtight closed container 20, the carbonated beverage therein can be poured out to a glass for consumption without losing the carbon dioxide. The above procedures can be repeated for further consumption.

Referring to FIGS. 4 to 7, a second preferred embodiment of the device for preserving carbonation of carbonated beverage during consumption is illustrated, in which an alternative mode of the adapter means is introduced. The second embodiment also comprises an airtight closed container 20' and an adapter 50. The airtight closed container 20' has a bottom end providing a connecting sleeve 21' which has an outer threaded portion 211' instead of the inner threaded portion 211 as shown in the above first embodiment. The airtight closed container 20 further has a top end providing a sealing means 22'. A first sealing gasket 23' is positioned at a bottom end of the connecting sleeve 21'. The sealing means 22' comprises an outlet 221' which has an outer thread portion 222' provide thereon, a seal cap 24' with an inner thread portion 241' and a second sealing gasket 25' positioned inside the seal cap 24'. By screwing the sealing cap 24' to the outer thread portion 222' of the outlet 221' until the tip edge of the outlet 221' pressing against the second sealing gasket 23' would make the sealing mean 22' tightly sealing the interior chamber of the airtight closed container 20' from the outside environment.

Figure 6:
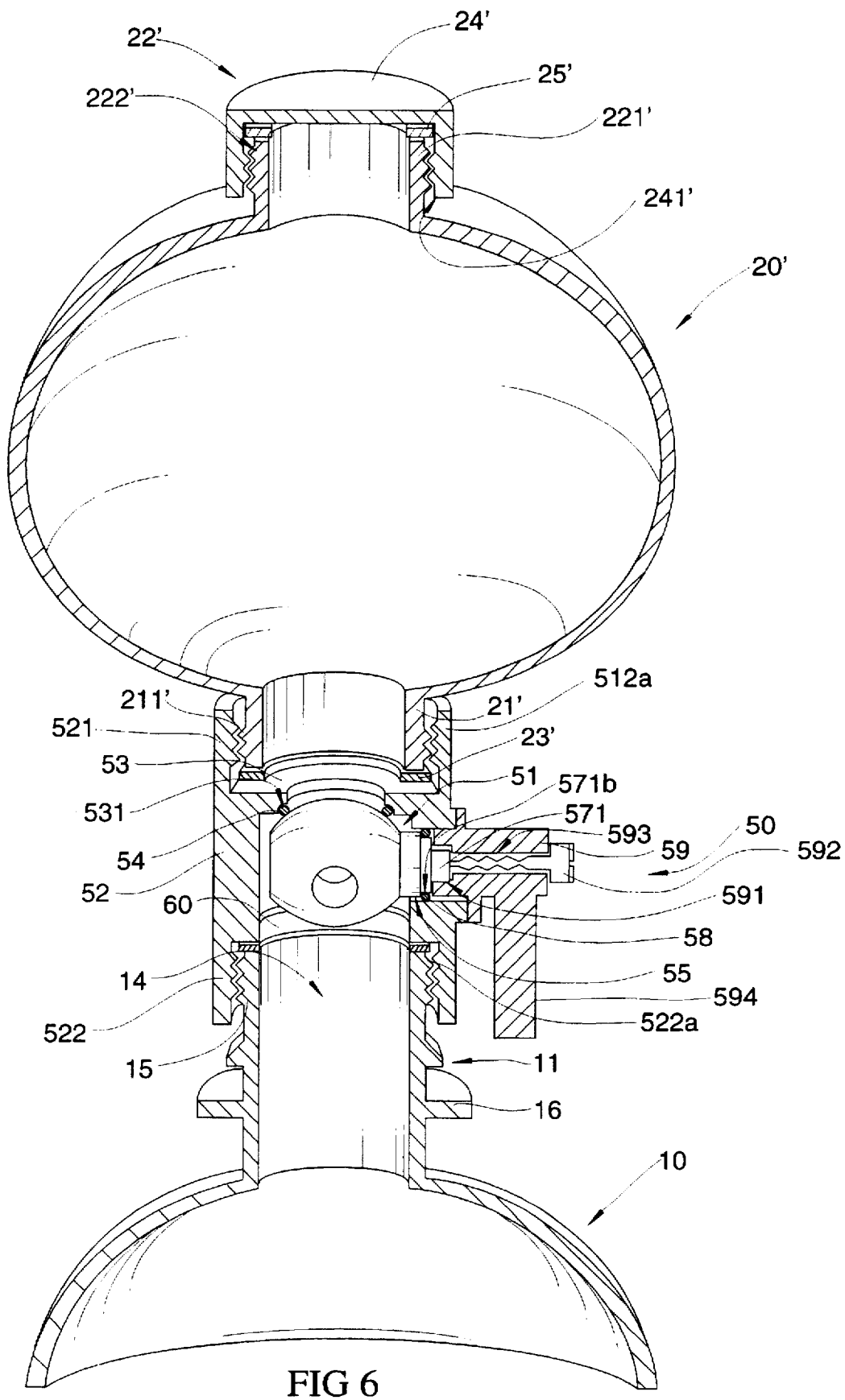
FIG. 6 is a sectional perspective view of the device for preserving carbonation of carbonated beverage during consumption which is mounted on the carbonated beverage bottle in an airtight manner according to the above second preferred embodiment of the present invention.
Figure 7:
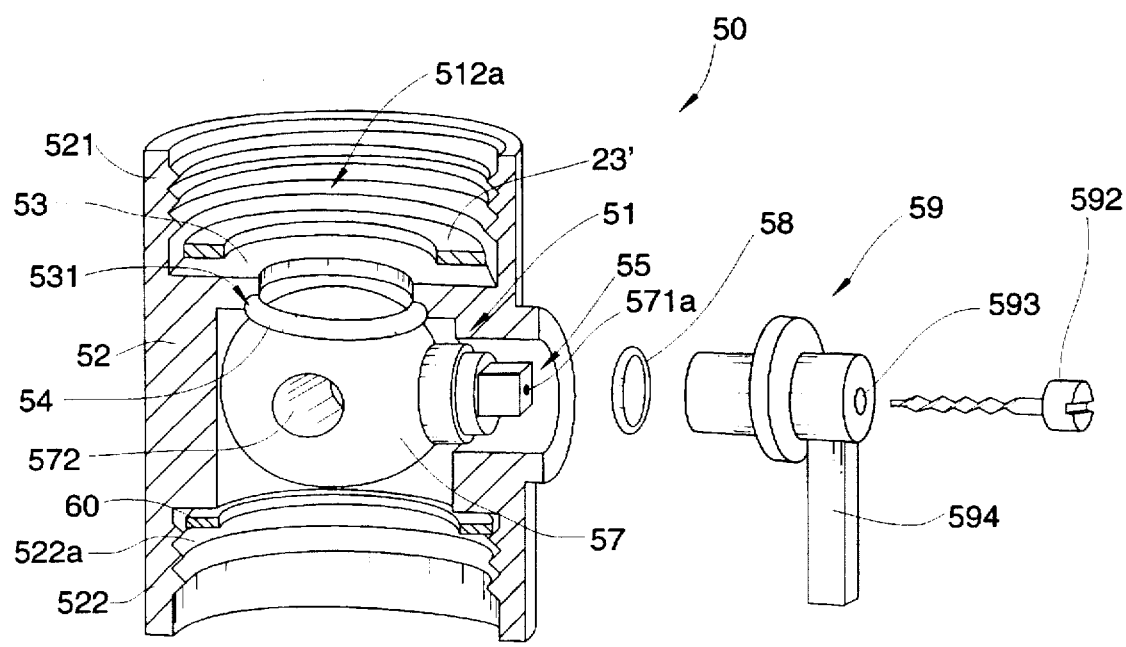
FIG. 7 is a partial sectional perspective view of the adapter of the device for preserving carbonation of carbonated beverage during consumption according to the above second preferred embodiment of the present invention.
Figure 8:
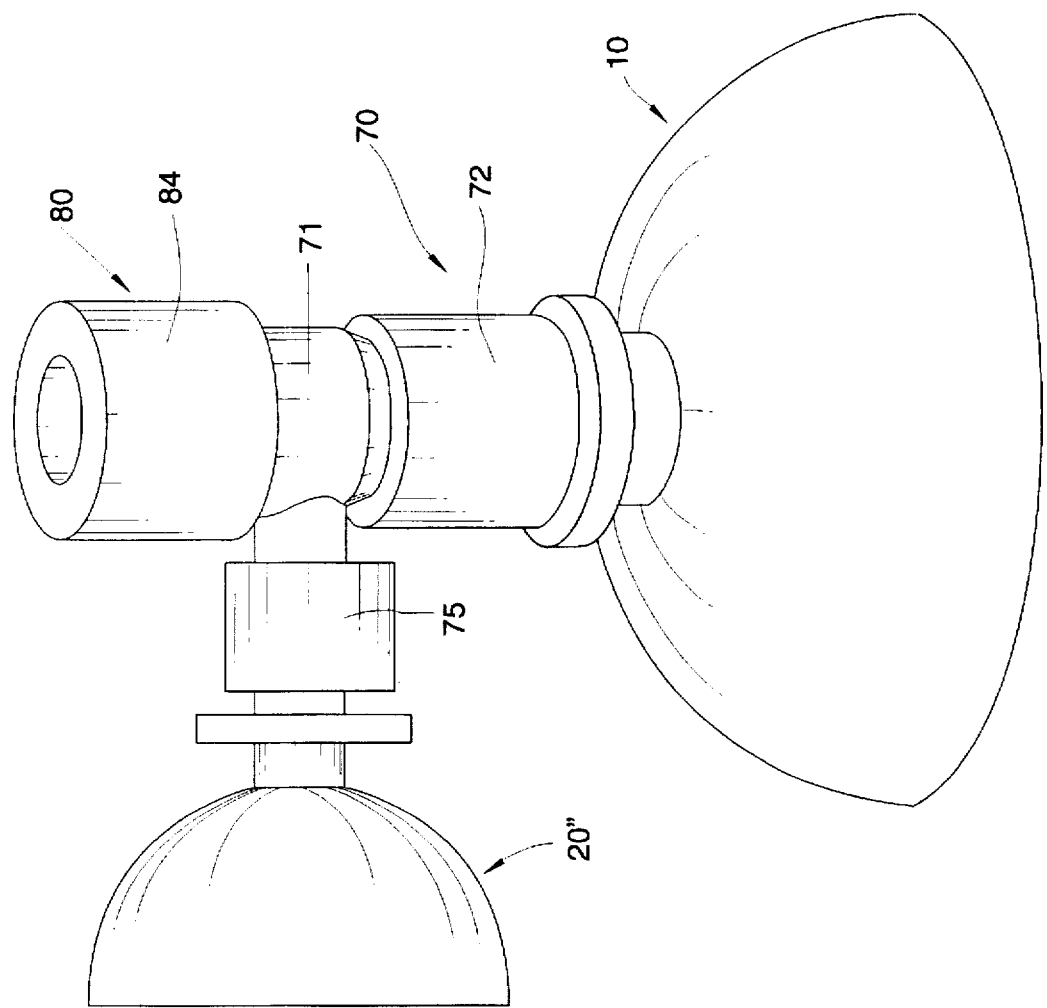
FIG. 8 is a perspective view of a device for preserving carbonation of carbonated beverage during consumption which is mounted on a carbonated beverage bottle in an airtight manner according to a third preferred embodiment of the present invention.
Figure 9:
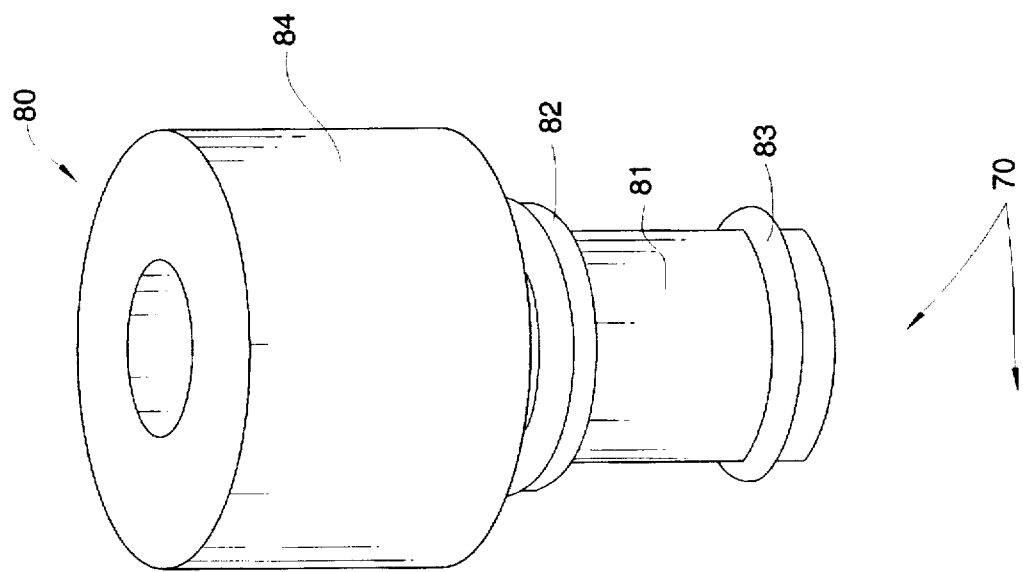
FIG. 9 is an exploded perspective of the adapter of the device for preserving carbonation of carbonated beverage during consumption, according to the above third preferred embodiment of the present invention.
Figure 9:
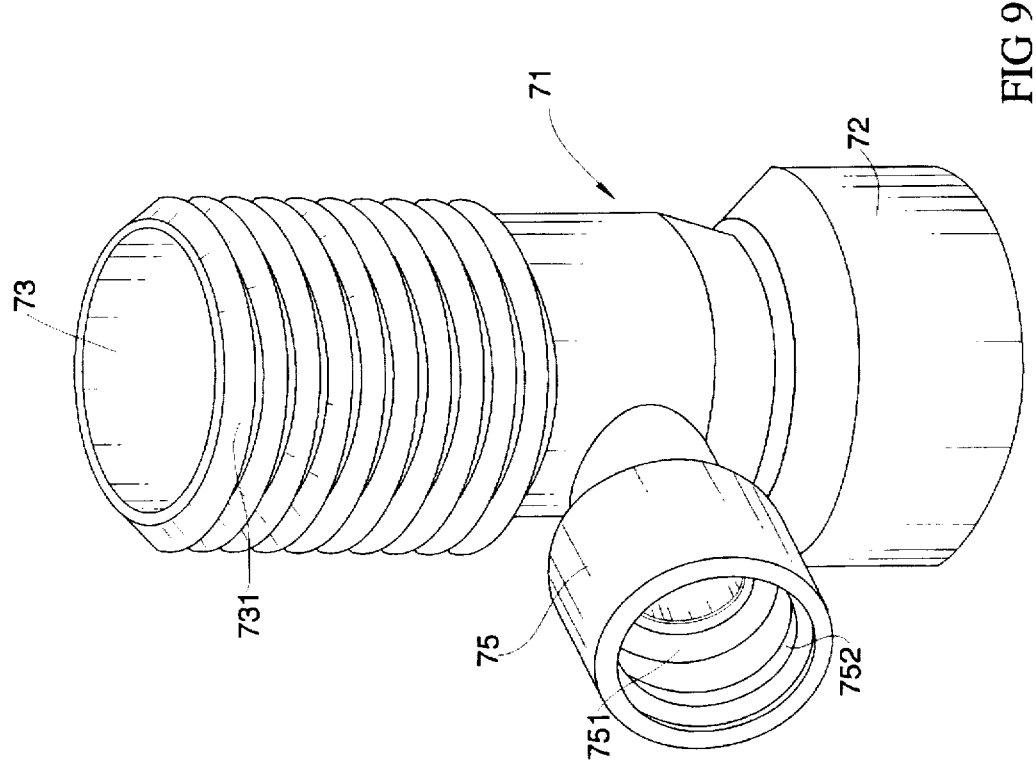

As shown in FIGS. 6 and 7, the adapter means 50 comprises a connecting main body 52 and a controller means 56. The connecting main body 52 has an exit sleeve 521 at an upper end thereof for connecting with the connecting sleeve 21' in an airtight manner, a holding sleeve 522 at a lower end thereof for connecting with the bottle head 11 of the carbonated beverage containing bottle 10 in an airtight manner, and a beverage passage 51 positioned between the exit sleeve 521 and the holding sleeve 522 thereof The controlling mean 53 is disposed in the beverage passage 51 for selectively closing the beverage passage 51 in an airtight manner or opening the beverage passage 51 to enable beverage flowing therethrough.

The exit sleeve 521 of the connecting main body 52 has an inner thread portion 521a for screwing with the outer threaded portion 211' of the connecting sleeve 21' until the tip edge of the connecting sleeve 21' is pressed against the first sealing gasket 23' positioned at a bottom of the exit sleeve 521 to achieve an airtight connection. A ring shoulder 53 is inwardly protruded between the exit sleeve 521 and the beverage passage 51. The ring shoulder 53 has a circular receiving groove 531 to enable a rubber O-ring 54 to sit thereon. The holding sleeve 522 of the connecting main body 52 has a inner connecting thread portion 522a for screwing with the outer thread portion 15 of the bottle head 11 of the carbonated beverage containing bottle 10 until a top end of the bottle head 11 is pressed against a third sealing gasket 60 positioned inside the holding sleeve 522 of the connecting main body 52. The connecting main body 51 further has a controlling hole 55 for communicating the beverage passage 51 with outside.

The controller means 56 comprises a ball valve 57 having a diameter equal to a diameter of the beverage passage 51. The ball valve 57, which has a square head 571 protruded and extended into the controlling hole 55 of the connecting main body 52 and a through hole 572 penetrated therethrough, is disposed within the beverage passage 51 and upwardly pressed against the O-ring 54, so that the O-ring 54 is disposed between the ring shoulder 53 and the ball valve 57 so as to close the beverage passage 51 in an airtight manner when the through hole 572 is not aligned with an axial of the ring shoulder 53. However, when the through hole 572 of the ball valve 57 is coaxially aligned with the ring shoulder 53, the beverage passage 51 is opened. The square head 571 has an axial threaded hole 571a extended from a free end and a round groove 571b to receive a sealing O-ring 58 which is fittingly disposed between an inner wall of the controlling hole 55 and the round groove 571b so as to make the beverage passage 51 being an airtight chamber while enabling the ball valve 57 to rotate therein.

The controlling mean 50 further comprises a turner 59 to hold the ball valve 57 in positioned, which has a square hole 591 at one end for connecting to the square head 571 of the ball valve 57 and an axial hole 593 extended therethrough. A bolt 592 is screwed from another end of the turner 59 through the axial hole 593 and screwed into the axial threaded hole 571a so as to affixed the turner 59 to the ball valve 57. A turning bar 594 is transversely extended from the turner 59 outside the controlling hole 55.

Referring to FIG. 6, normally the ball valve 57 is rotated to a closed position, that is the through hole 572 of the ball valve 57 is transversely positioned and is not aligned with the axial of the ring shoulder 53 of the connecting main body 52, so that the carbonated beverage containing bottle 10 is closed. Moreover, the third sealing gasket 60 and the sealing O-ring 58 render the interior of the carbonated beverage containing bottle 10 entirely airtight from the outside surrounding so that no carbonation or carbon dioxide in the carbonated beverage within the carbonated beverage containing bottle 10 will escaped outside and be preserved inside the carbonated beverage containing bottle 10.

In order to dispense the carbonated beverage inside the carbonated beverage containing bottle 10, simply turn the carbonated beverage containing bottle 10 up side down and turn the turning bar 594 to drive the ball valve 57 to rotate until the through hole 572 is coaxially aligned with the ring shoulder 53. Then the present invention is adjusted to an opened position, so that the carbonated beverage inside the carbonated beverage containing bottle 10 can flow into the airtight closed container 20' and fill it up through the beverage passage 51 and via the through hole 572 of the ball valve 57. Once the amount of the carbonated beverage desired is fulfilled or the airtight closed container 20 is filled up, the user has to turn the turning bar 594 again to rotate the ball valve 57 until the through hole 572 is not aligned with the ring shoulder 53, so that the carbonated beverage containing bottle 10 is re-operated to the closed position again so as to preserve the carbonation or carbon dioxide within the carbonated beverage that remains in the carbonated beverage containing bottle 10.

Similarly, turn the carbonated beverage containing bottle 10 back to the upright position. By opening the sealing cap 24' of the airtight closed container 20', the carbonated beverage therein can be poured out to a glass for consumption without losing the carbon dioxide. The above procedures can be repeated for further consumption.

Referring to FIGS. 8 to 11, a third preferred embodiment of the device for preserving carbonation of carbonated beverage during consumption of the present invention is illustrated, wherein another alternative mode of the adapter means is introduced.

The adapter means 70 of the third embodiment is adapted to connected between the carbonated beverage containing bottle 10 and an other airtight closed container 20" which only has one opening 201" in an airtight manner. Practically, the airtight closed container 20" can be substituted with the airtight closed container 20' as shown in the above second preferred embodiment. The airtight closed container 20" can be a smaller size soda or water bottle available in market. The adapter means 70 comprises a T-shaped connecting body 71 which has a holding sleeve 72 at a lower end thereof for connecting to the bottle head 11 of the carbonated beverage containing bottle 10 in an airtight manner, a controlling sleeve 73 at a top end thereof, a passage chamber 74 extended between the connecting sleeve 72 and the controlling sleeve 73 and an exit sleeve 75 integrally extended from the passage chamber 74 for connecting to a connecting sleeve 21" of the airtight closed container 20" by screwing with an outer threaded portion 211" on the connecting sleeve 21" in an airtight manner. The adapter means 70 further comprises a controller means 80 extended from the controlling sleeve 73 to the passage chamber 74 for selectively closing the passage chamber 74 in an airtight manner or opening the passage chamber 74 for enabling the carbonated beverage inside the carbonated beverage containing bottle 10 to flow into the airtight closed container 20" through the passage chamber 74.

The controlling sleeve 73, the passage chamber 74 and the holding sleeve 72 are coaxially aligned to form a tubular body. The exit sleeve 75 is transversely connected to the passage chamber 74, wherein an intersection of the exit sleeve 75 and the passage chamber 74 defines a passage opening 76, so that the carbonated beverage within the carbonated beverage containing bottle 10 can be poured into the airtight closed container 20" via the passage chamber 74 and the passage opening 76.

The exit sleeve 75 of the connecting body 71 has a first sealing gasket 751 disposed on a bottom thereof and an inner thread portion 752 for screwing with the outer threaded portion 21" of the connecting sleeve 21" until a tip edge of the connecting sleeve 21" is pressed against the first sealing gasket 751 to ensure an airtight connection. The holding sleeve 72 of the connecting body 71 has a second sealing gasket 721 disposed on bottom thereof and an inner connecting thread portion 722 for screwing with the outer thread portion 15 of the bottle head 11 of the carbonated beverage containing bottle 10 until a top end of the bottle head 11 is pressed against the second sealing gasket 721 to ensure an airtight connection. The controlling sleeve 73 has an outer thread portion 731.

The controller means 80 comprises an outer adjusting sleeve 84 whose top end is integrally connected to a top end of the valve rod 81 to define a receiving ring groove 841 therebetween. The outer adjusting sleeve 84 has an inner threaded wall 842 for screwing onto the outer thread portion 731 of the controlling sleeve 73 so as to connect the valve rod 81 with the controlling sleeve 73. Therefore, by turning the adjusting sleeve 84 about the controlling sleeve 73 one can drive the valve rod 81 upwardly to open the passage opening 76 or downwardly to close the passage opening 76 easily. Moreover, a narrowing tapered neck 741 is extended from a bottom end of passage chamber 74 to the connecting sleeve 72 so that the carbonated beverage can flow more steadily to the airtight closed container 20" passage chamber 74 and the passage opening 76, also the uneven friction that the lower O-ring 83 would otherwise sustain when it passes over the passage opening 76 can be avoided.

The controller means 80 also comprises a valve rod 81 having a solid bottom end, which is slidably inserted into the controlling sleeve 73 and extended into the passage chamber 74. The valve rod 81 has an upper round groove 811 and a lower round groove 812, wherein a distance between the upper and the lower round groove 811, 812 is larger than the size of the passage opening 76. An upper O-ring 82 and a lower O-ring 83 are respectively held in the upper and lower round groove 811, 812, wherein the upper O-ring 82 must be pressed against an inner wall of the controlling sleeve 73 and the lower O-ring 83 must be pressed against an inner wall of the lower portion of passage chamber 74.

Figure 10:
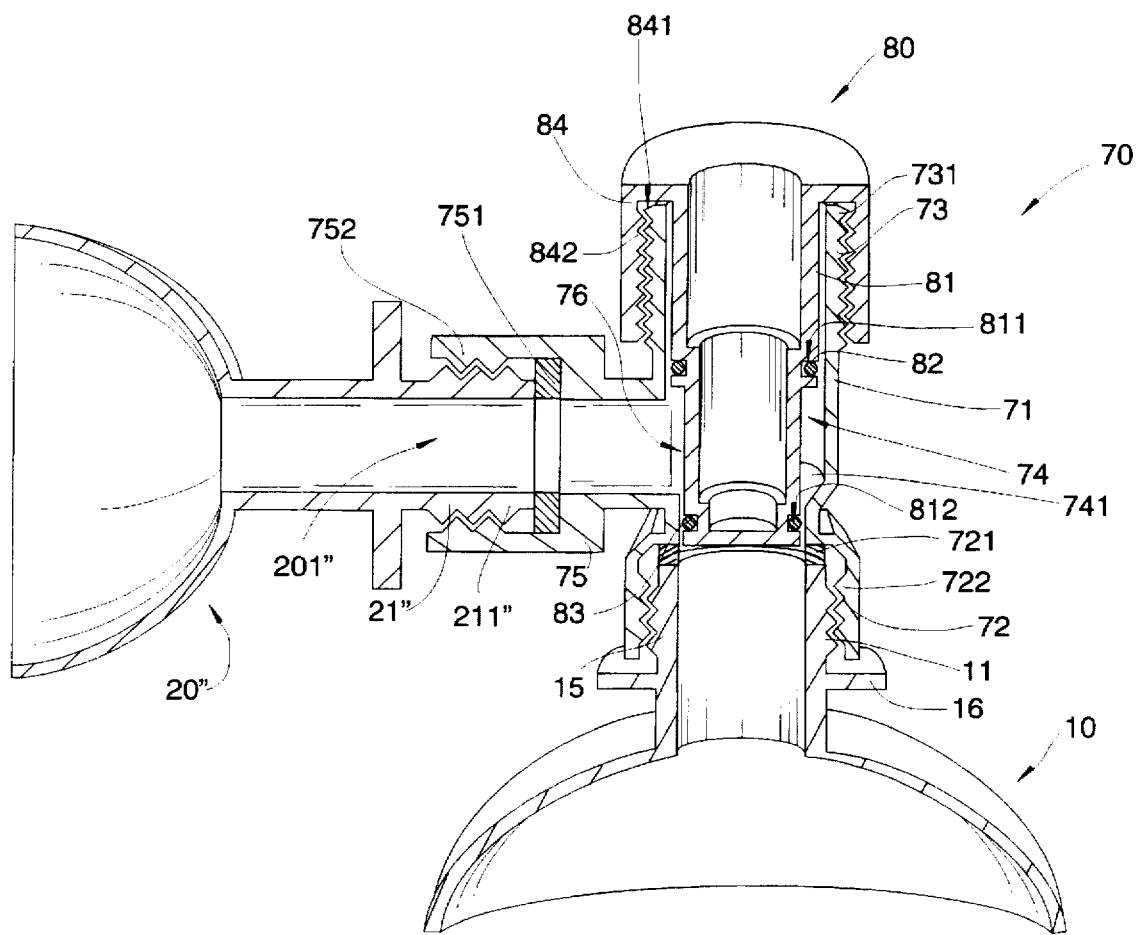
FIG. 10 is a sectional perspective view of the device for preserving carbonation of carbonated beverage during consumption, in closed position, according to the above third preferred embodiment of the present invention.
Figure 11:
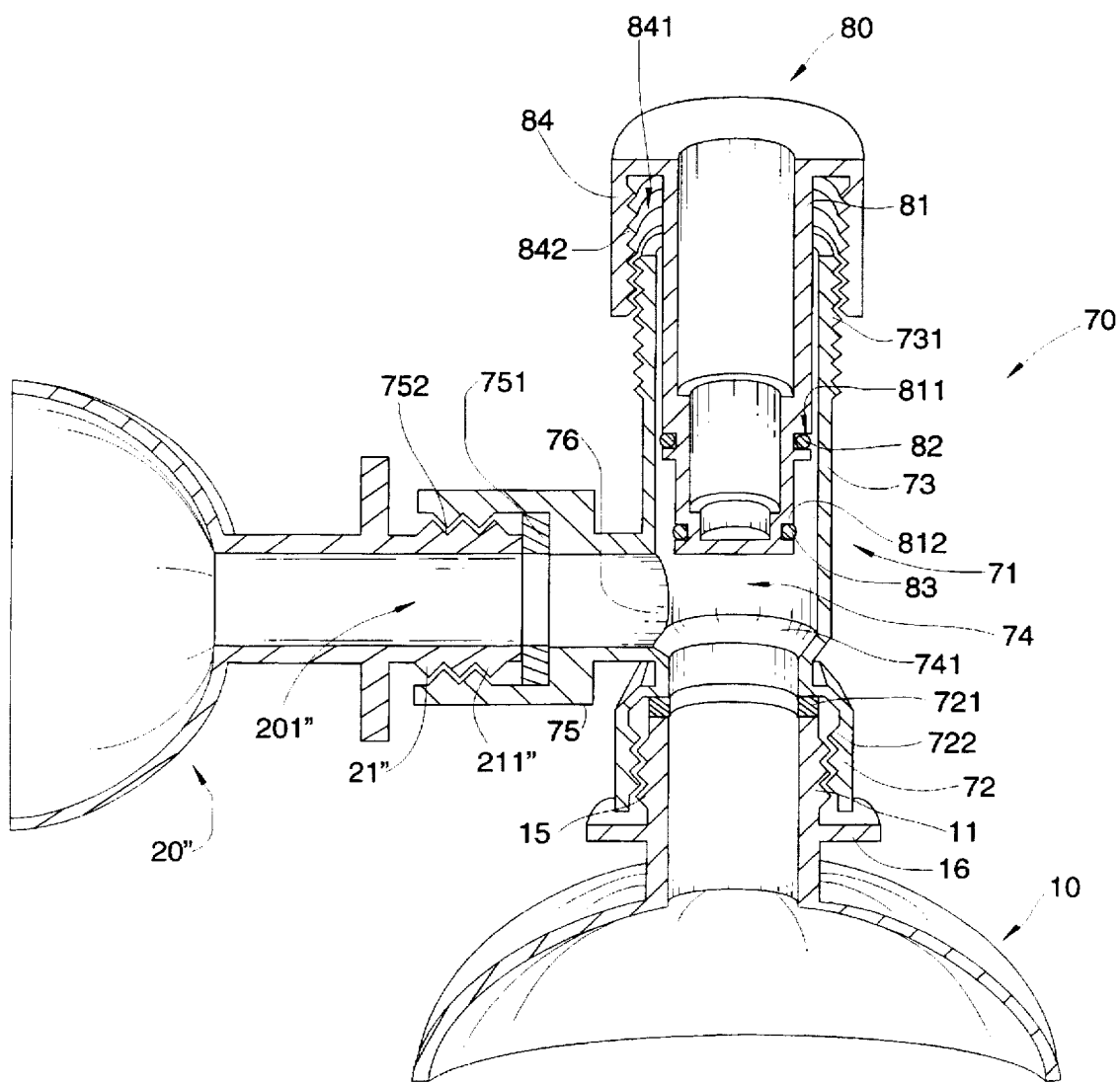
FIG. 11 is a sectional perspective view of the device for preserving carbonation of carbonated beverage during consumption, in opened position, according to the above third preferred embodiment of the present invention.
Figure 12:
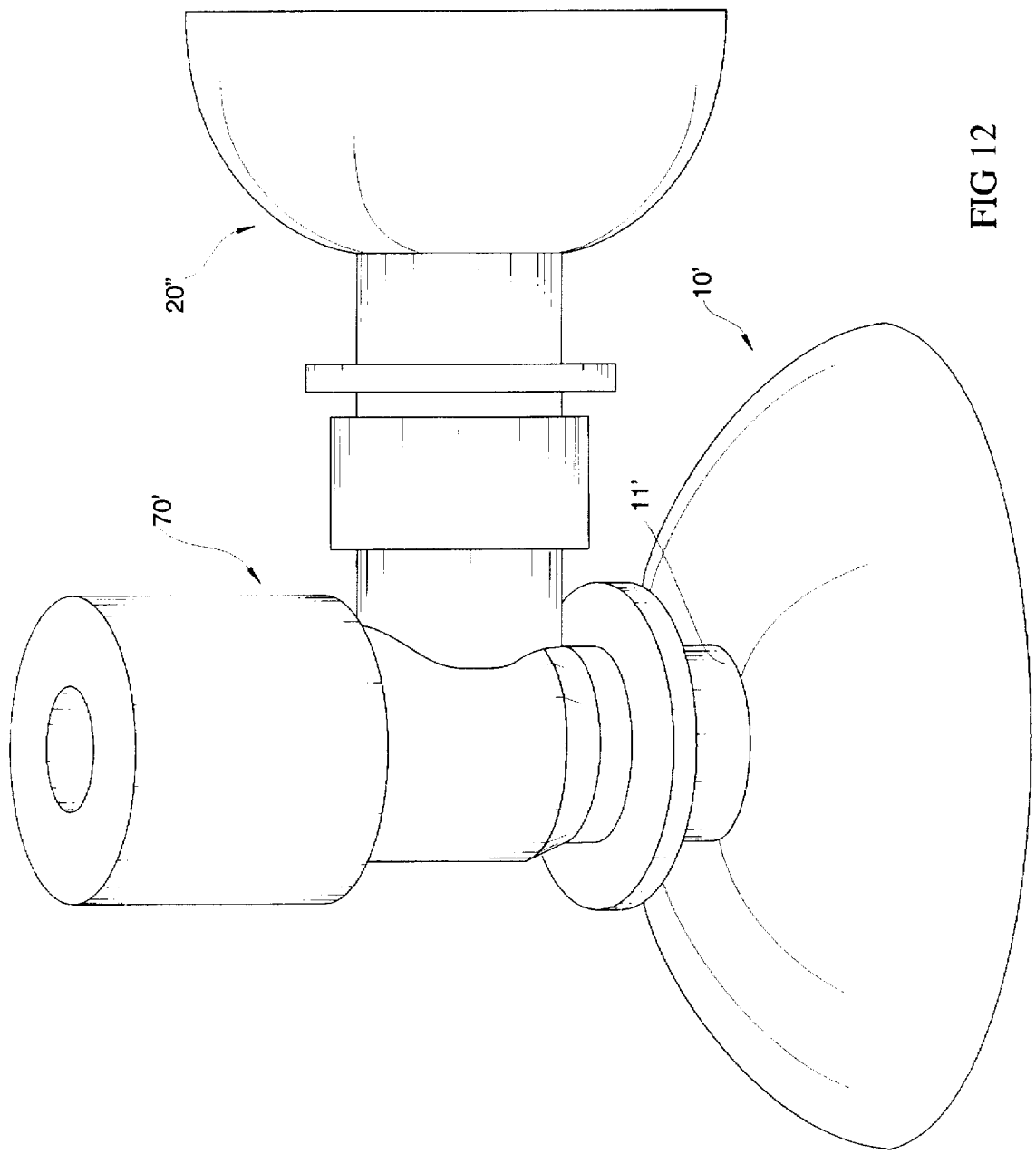
FIG. 12 is a partial perspective view of the device for preserving carbonation of carbonated beverage during consumption according to an alternative mode of the above third preferred embodiment of the present invention.
Figure 13:
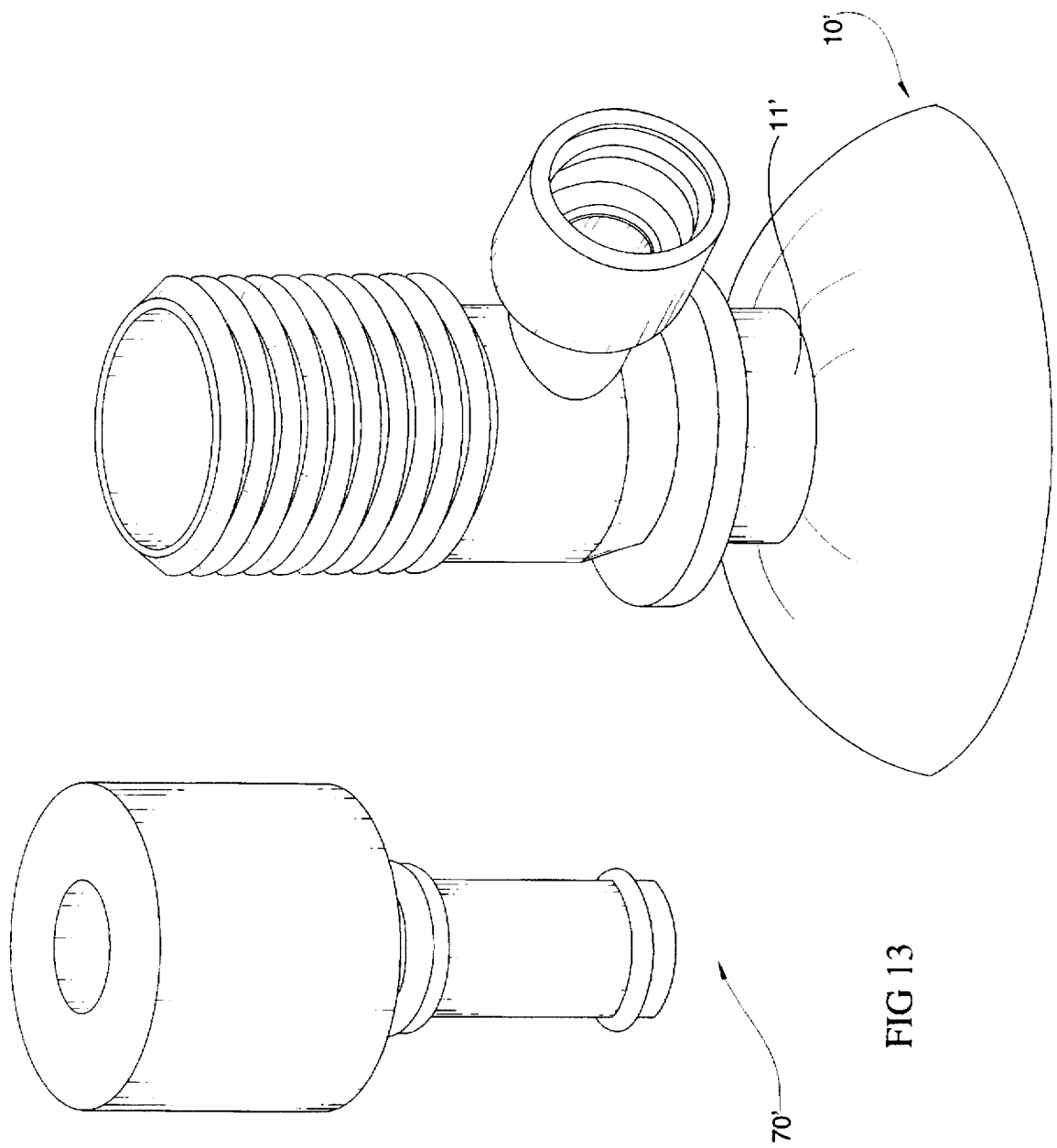
FIG. 13 is an exploded perspective view of the alternative mode according to the above third preferred embodiment of the present invention.
Figure 14:
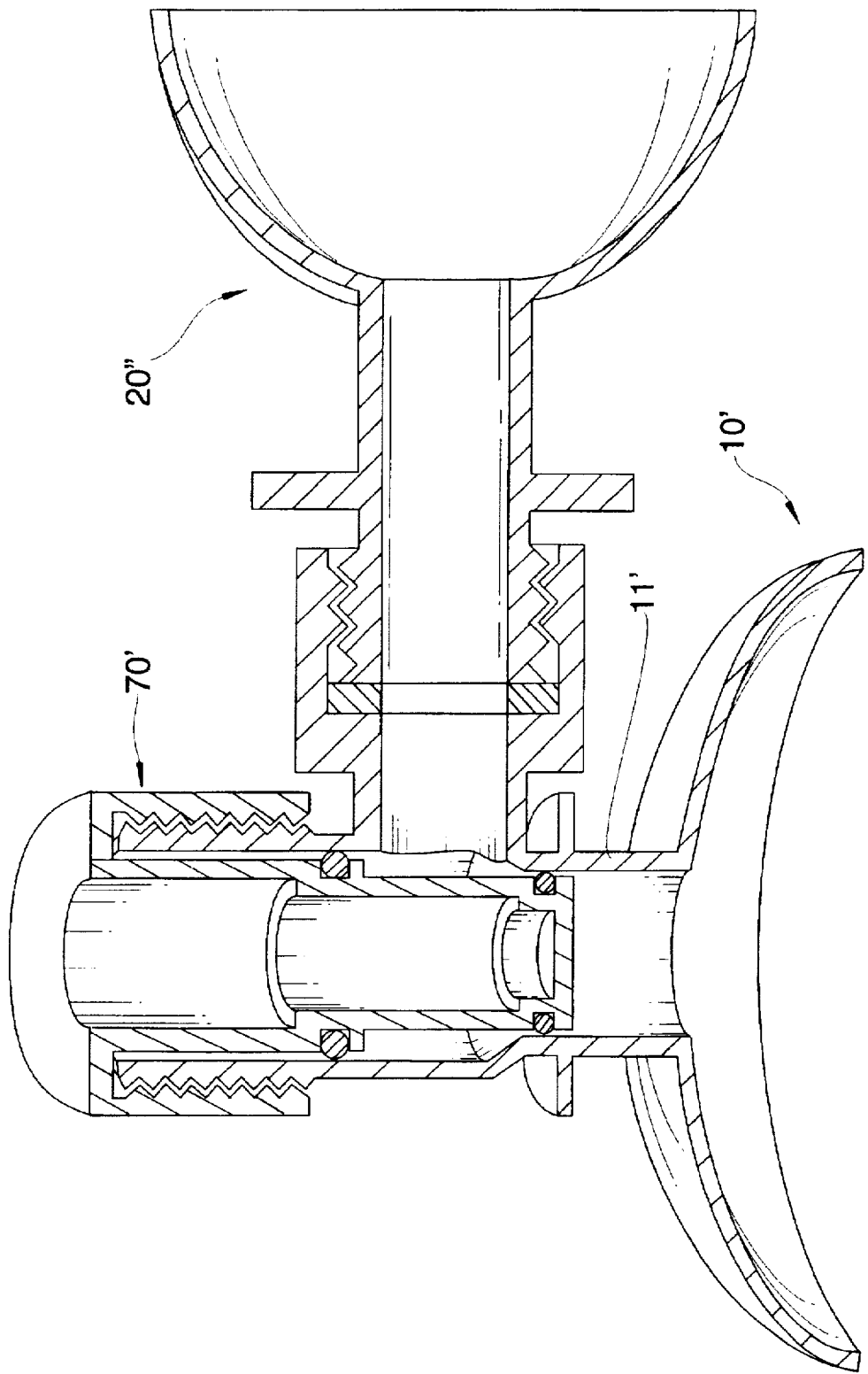
FIG. 14 is a partial sectional perspective view of the alternative mode, in closed position, according to the above third preferred embodiment of the present invention.
Figure 15:
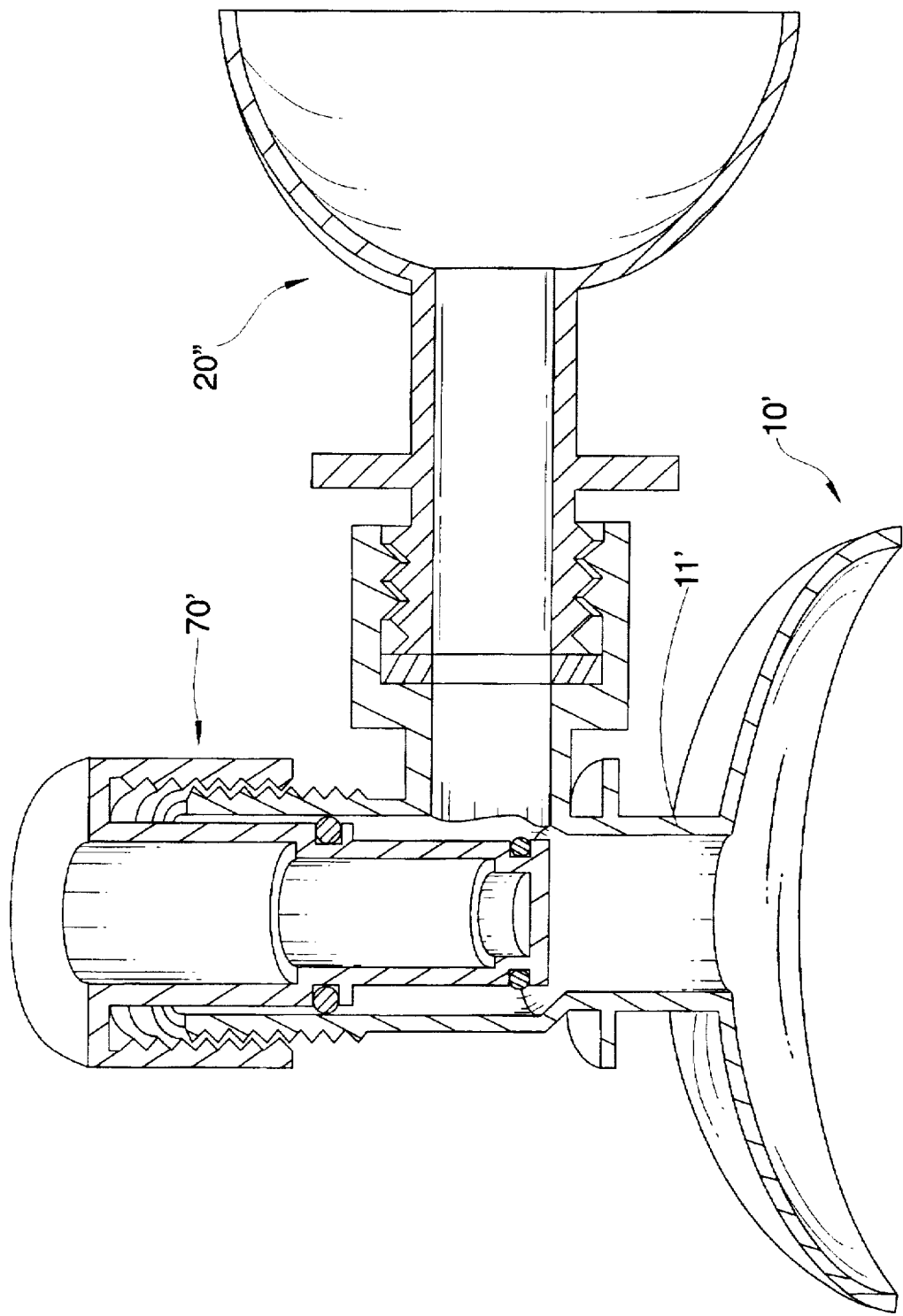
FIG. 15 is a partial sectional perspective view of the alternative mode, in opened position, according to the above third preferred embodiment of the present invention.

Therefore, when the valve rod 81 is fully inserted into connecting body 71 through the controlling sleeve 73, the valve rod 81 is in a closed position so that the upper O-ring 82 is positioned above the passage opening 76 and the lower O-ring 83 is positioned below the passage opening 76, so that the passage opening 76 is airtightly closed, as shown in FIG. 10. In such a closed position, the carbonated beverage containing bottle 10 is sealedly closed from outside and the airtight closed container 20" by the valve rod 81 and the lower O-ring 83 thereon in an airtight manner. Besides, the airtight closed container 20" is also sealedly closed by the valve rod 81 and the upper O-ring 82 in an airtight manner. In order to dispense the carbonated beverage within the carbonated beverage containing bottle 10, the user may simply drive the valve rod 81 upwardly from the controlling sleeve 73 until the lower O-ring 83 is positioned within or above the passage chamber 74, so that the passage opening 76 is opened, as shown in FIG. 11. At that condition, the valve rod 81 is in an opened position so that the carbonated beverage within the carbonated beverage containing bottle 10 can be poured out to flow into the airtight closed container 20" through the passage chamber 74 and the passage opening 76. It must be mentioned that, at that moment, the carbonated beverage containing bottle 10, the airtight closed container 20" and the adapter means 70 are still in an airtight and closed condition by means of the upper O-ring 82, therefore no carbonation or carbon dioxide will escape or leak to the outside. In other words, only the amount of carbonated beverage that has the same volume as the capacity of the airtight closed container 20" and the dissolved carbon dioxide it contains will flow from the carbonated beverage containing bottle 10 and fill into the airtight closed container 20". Afterwards, the user may drive the valve rod 81 downwards again to its closed position, and then the carbonation or carbon dioxide within carbonated beverage containing bottle 10 can be preserved and prevented from leaking or escaping to the atmosphere. Finally, the user can consume the carbonated beverage inside the airtight closed container 20" by turning and disengaging the connecting sleeve 21" on the airtight closed container 20" from the exit sleeve 75 with the airtight closed container 20" in an upright position.

Referring to FIGS. 12 to 15, an alternative mode of the above third preferred embodiment of the present invention is illustrated, which has a similar structure of the above third embodiment. In which, the holding sleeve 72 of the adapter means 70 is eliminated and the adapter 70' of the present alternative mode is integrally connected to a bottle head 11' of a beverage containing bottle 10' In other words, the beverage containing bottle 10' itself has integrally provided with the adapter 70' for sealedly connecting with the airtight closed container 20" or the airtight closed container 20' as shown in the second preferred embodiment. Other structures of the present alternative mode are identical with the above third preferred embodiment.

In view of the above embodiments, we can conclude a common process for preserving carbonation of carbonated beverage during consumption, which comprises the steps of:

(a) sealedly and airtightly closing a bottle opening of a carbonated beverage containing bottle;

(b) sealedly and airtightly closing an outlet of an airtight closed container which has a smaller volume than the carbonated beverage containing bottle and is connected to the carbonated beverage containing bottle by means of an adapter means;

(c) opening the bottle opening of the carbonated beverage containing bottle and pouring an amount of carbonated beverage equal to or less than the capacity of the airtight closed container from win the carbonated beverage containing bottle to fill the airtight closed container via the adapter means;

(d) sealedly and airtightly closing the bottle opening of the carbonated beverage containing bottle again;

(e) opening an outlet of the airtight closed container to consume the carbonated beverage filled therein while the bottle opening of the carbonated beverage containing bottle remains sealedly and airtightly closed; and (f) re-closing the outlet of the airtight closed container in an airtight manner.

It is worth to mention that novelty is the ability to achieve some good, beneficial, and desirable results or effects, which are also very difficult to achieve, i.e. attempted unsuccessfully by someone before.

The crucial point here is, when one's object is just to design a dispenser to dispense a predetermined quantity of liquid in an accurate, convenient and quick way, it may become obvious to achieve that by using or modifying prior arts such as Morris' design. But on the other hand, when one's object is to engineer a gas trapper to save the carbonation of a bottle of soda during its consumption, it is not obvious how one can achieve that by using or modifying those prior arts, or one will simply not be thinking of these prior arts at all since none of them has anything to do with saving the carbonation of the liquid that they are dispensing. In other words, even if having access to all these prior arts which all serve the similar purpose of dispensing a certain quantity of liquid quickly and have nothing to do with saving the carbonation of the liquid at all, it is still not obvious to anyone that how one of these prior designs can be used, modified, or converted to achieve the effect of saving the on of a bottle of soda. As a matter of fact, all the inventors of the patents referenced above in the background of the present invention U.S. Pat. No. : 4,723,670, 4,860,932, 4,932,544, 5,635,232, and 5,025,953) could reasonably be assumed experts in the art of preserving on during dispensing of bottled soda beverages, and yet none of them has figured out our way of doing it over all those years, this further supports that it is not obvious to just anyone in the art to figure out our invention which has the described new, novel and unexpected result.

What is claimed is:

1. A process for preserving carbonation of carbonated beverage during consumption, comprising the steps of:

(a) sealedly and airtightly closing a bottle opening of a carbonated beverage containing bottle having a carbonated beverage therein;

(b) sealedly and airtightly closing an outlet of an airtight closed container which has a smaller volume than said carbonated beverage containing bottle and is connected to said carbonated beverage containing bottle by means of an adapter means;

(c) opening said bottle opening of said carbonated beverage containing bottle and pouring an amount of said carbonated beverage equal to or less than a capacity of said airtight closed container from said carbonated beverage containing bottle to fill said airtight closed container via said adapter means;

(d) sealedly and airtightly closing said bottle opening of said carbonated beverage containing bottle again;

(e) opening an outlet of beverage airtight closed container to consume said carbonated beverage filled therein while said bottle opening of said carbonated beverage containing bottle remain sealedly and airtightly closed; and (f) re-closing said outlet of said airtight closed container in an airtight manner.

2. A process for preserving carbonation of carbonated beverage during consumption, comprising the steps of:

(g) sealedly and airtightly closing a bottle opening of a carbonated beverage containing bottle having a carbonated beverage therein;

(h) sealedly and airtightly closing an outlet of a container which has a smaller volume than said carbonated beverage containing bottle and is connected to said carbonated beverage containing bottle by means of an adapter means;

(i) opening said bottle opening of said carbonated beverage containing bottle and pouring an amount of said carbonated beverage equal to or less than a capacity of said container from said carbonated beverage containing bottle to fill said airtight closed container via said adapter means;

(j) sealedly and airtightly closing said bottle opening of said carbonated beverage containing bottle again;

(k) detaching said container from said adapter to consume said carbonated beverage filled therein while said bottle opening of said carbonated beverage containing bottle remains sealedly and airtightly closed; and (l) re-connecting said container to said adapter in an airtight manner.

3. A device for preserving carbonation of carbonated beverage during consumption from a carbonated beverage containing bottle having a large amount of carbonated beverage therein and a bottle head with an bottle opening, comprising:

an airtight closed container having a volume smaller than said carbonated beverage containing bottle, which one end is provided with a connecting sleeve; and an adapter means, which is connected between said bottle head of said carbonated beverage containing bottle and said airtight closed container in an airtight manner, for selectively closing said bottle opening of said carbonated beverage containing bottle from an interior of said airtight closed container in an airtight manner and opening said bottle opening of said carbonated beverage containing bottle to enable an amount of carbonated beverage equal to or less than the capacity of said airtight closed container inside said carbonated beverage containing bottle to be poured into said airtight closed container.

4. A device for preserving carbonation of carbonated beverage during consumption, as recited in claim 3, wherein another end of said airtight closed container provides a sealing means for selectively sealedly and airtightly closing said airtight closed container, and that said adapter means comprises a connecting mean and a conducting pipe, wherein said airtight closed container is affixed to said bottle opening of said carbonated beverage containing bottle in an airtight manner by means of said connecting mean and said conducting pipe.

5. A device for preserving carbonation of carbonated beverage during consumption, as recited in claim 4, wherein said conducting pipe which is a round hollow tube has a top end connected to said connecting sleeve provided on said airtight closed container in an airtight manner, a top opening, an enlarged closed bottom end having tapered shoulder formed therearound for sealing of said bottle opening when said conducting pipe is in a closed position, and an orifice formed at a lower portion of said conducting pipe for outleting said beverage inside said carbonated beverage containing bottle, wherein said connecting mean comprises an outer holding ring and an inner extended tube which top end is integrally connected with a top end of said outer holding ring to form a one piece body, and that a receiving ring groove is defined between an inner wall of said outer holding ring and said outer wall of said inner extended tube for receiving and connecting with said bottle head of said carbonated beverage containing bottle in an airtight manner, moreover said inner extended tube having an upper portion forming an upper circular groove to fittingly receive a first O-ring, a lower portion additionally forming a lower circular groove to fittingly receive a second O-ring, and a bottom tapered end shoulder which enables said tapered shoulder of said conducting pipe to sit thereon so as to close said conducting pipe, wherein said conducting pipe is fittingly inserted through said inner extended tube which has a length longer than that of said outer holding ring but shorter than that of said conducting pipe, wherein said first and second O-rings are respectively pressed against an outer wall of said conducting pipe, and that during a closed position, said orifice on said conducting pipe is positioned between said first and said second O-rings to ensure an airtight connection between said conducting pipe and said inner extended tube while enabling said conducting pipe to slide up and down.

6. A device for preserving carbonation of carbonated beverage during consumption, as recited in claim 5, wherein said inner wall of the outer holding ring is provided with a threaded portion, a first sealing gasket being positioned inside the receiving ring groove, said bottle head having an outer thread portion for screwing on said threaded portion of said inner wall of said outer holding ring until a top end of said bottle head is pressed against said first sealing gasket to ensure an airtight connection.

7. A device for preserving carbonation of carbonated beverage during consumption, as recited in claim 6, wherein said connecting sleeve of said airtight closed container has an inner threaded portion, and a second sealing gasket is positioned inside said connecting sleeve, said connecting sleeve being connected with said top thread end of said conducting pipe in an airtight manner by screwing said top thread end of said conducting pipe with said inner threaded portion of said connecting sleeve until said top thread end is tightly pressed against said second sealing gasket.

8. A device for preserving carbonation of carbonated beverage during consumption, as recited in claim 7, wherein said sealing means comprises an outlet which has an outer thread portion provide thereon, a seal cap with an inner thread portion and a third sealing gasket positioned inside said seal cap, and that by screwing said sealing cap to said outer thread portion of said outlet until said tip edge of said outlet pressing against said third sealing gasket would make said sealing mean tightly sealing said interior chamber of said airtight closed container from outside.

9. A device for preserving carbonation of carbonated beverage during consumption, as recited in claim 3, wherein another end of said airtight closed container provides a sealing means for selectively sealedly and airtightly closing said airtight closed container, and that said adapter means comprises a connecting main body and a controller means, said connecting main body having an exit sleeve at an upper end thereof for connecting with said connecting sleeve provided on said airtight closed container in an airtight manner, a holding sleeve at a lower end thereof for connecting with said bottle head of said carbonated beverage containing bottle in an airtight manner, and a beverage passage positioned between said exit sleeve and said holding sleeve thereof, wherein said controlling mean is disposed in said beverage passage for selectively airtightly closing said beverage passage and opening said beverage passage to enable said carbonated beverage flowing therethrough.

10. A device for preserving carbonation of carbonated beverage during consumption, as recited in claim 9, wherein said exit sleeve of said connecting main body has an inner thread portion for screwing with said outer threaded portion of said connecting sleeve of said airtight closed container until said tip edge of said connecting sleeve is pressed against a first sealing gasket positioned at a bottom of said exit sleeve to achieve an airtight connection.

11. A device for preserving carbonation of carbonated beverage during consumption, as recited in claim 10, wherein a ring shoulder is inwardly protruded between said exit sleeve and said beverage passage, said ring shoulder having a circular receiving groove to enable a rubber O-ring to sit thereon, said holding sleeve of said connecting main body having an inner connecting thread portion for screwing with an outer thread portion provided on said bottle head of said carbonated beverage containing bottle until a top end of said bottle head is pressed against a second sealing gasket positioned inside said holding sleeve of said connecting main body, said connecting main body further having a controlling hole for communicating said beverage passage with outside, said controller means comprising a ball valve having a diameter equal to a diameter of said beverage passage, wherein said ball valve, which has a square head protruded and extended into said controlling hole of said connecting main body and a through hole penetrated therethrough, is disposed within said beverage passage and upwardly pressed against said O-ring, so that said O-ring is disposed between said ring shoulder and said ball valve so as to close said beverage passage in an airtight manner when said through hole is not aligned with an axial of said ring shoulder, besides when said through hole of said ball valve is coaxially aligned with said ring shoulder, said beverage passage is opened.

12. A device for preserving carbonation of carbonated beverage during consumption, as recited in claim 11, wherein said square head has an axial threaded hole extended from a free end and a round groove to receive a sealing O-ring which is fittingly disposed between an inner wall of said controlling hole and said round groove so as to make said beverage passage being an airtight chamber while enabling said ball valve to rotate therein.

13. A device for preserving carbonation of carbonated beverage during consumption, as recited in claim 12, wherein said controlling mean further comprises a turner to hold said ball valve in positioned, which has a square hole at one end for connecting to said square head of said ball valve and an axial hole extended therethrough, a bolt is screwed from another end of said turner through said axial hole and screwed into said axial threaded hole so as to affixed said turner to said ball valve, and a turning bar is transversely extended from said turner outside said controlling hole.

14. A device for preserving carbonation of carbonated beverage during consumption, as recited in claim 13, wherein said sealing means comprises an outlet having an outer thread portion provide thereon, a seal cap with an inner thread portion and a third sealing gasket positioned inside said seal cap, wherein by screwing said sealing cap to said outer thread portion of said outlet until a tip edge of said outlet pressing against said third sealing gasket to ensure airtight connection.

15. A device for preserving carbonation of carbonated beverage during consumption, as recited in claim 3, wherein said adapter means comprises a connecting body which has a holding sleeve at a lower end thereof for connecting to said bottle head of said carbonated beverage containing bottle in an airtight manner, a controlling sleeve at a top end thereof, a passage chamber extended between said connecting sleeve and said controlling sleeve, and an exit sleeve integrally extended from said passage chamber for connecting to said connecting sleeve of said airtight closed container in an airtight manner.

16. A device for preserving carbonation of carbonated beverage during consumption, as recited in claim 15, wherein said adapter means fiber comprises a controller means extended from said controlling sleeve to said passage chamber for selectively closing said passage chamber in an airtight manner and opening said passage chamber for enabling said carbonated beverage inside said carbonated beverage containing bottle to pour into said airtight closed container through said passage chamber.

17. A device for preserving carbonation of carbonated beverage during consumption, as recited in claim 16, wherein said controlling sleeve, said passage chamber and said holding sleeve are coaxially aligned to form a tubular body, and said exit sleeve is transversely connected to said passage chamber, wherein an intersection of said exit sleeve and said passage chamber defines a passage opening, so that said carbonated beverage within said carbonated beverage containing bottle is able to pour into said airtight closed container via said passage chamber and said passage opening.

18. A device for preserving carbonation of carbonated beverage during consumption, as recited in claim 17, wherein said controller means comprises a valve rod having a solid bottom end, which is slidably inserted into said controlling sleeve and extended into said passage chamber, said valve rod having an upper round groove and a lower round groove, wherein a distance between said upper and said lower round groove is larger than said size of said passage opening, and that an upper O-ring and a lower O-ring are respectively held in said upper and lower round groove, wherein said upper O-ring is pressed against an inner wall of said controlling sleeve and said lower O-ring is pressed against an inner wall of said passage chamber, so that when said valve rod is fully inserted into connecting body through said controlling sleeve, said valve rod is in a closed position that said upper O-ring is positioned above said passage opening and said lower O-ring is positioned below said passage opening, and that when valve rod is pulled upwardly from said controlling sleeve until said lower O-ring is positioned within or above said passage chamber, said passage opening is opened and said valve rod is in an opened position that said carbonated beverage within said carbonated beverage containing bottle is able to pour into said airtight closed container through said passage chamber and said passage opening.

19. A device for preserving carbonation of carbonated beverage during consumption, as recited in claim 18, wherein said exit sleeve of said connecting body has a first sealing gasket disposed on a bottom thereof and an inner thread portion for screwing with an outer threaded portion provided on said connecting sleeve until a tip edge of said connecting sleeve is pressed against said first sealing gasket to ensure an airtight connection, and that said holding sleeve of said connecting body has a second sealing gasket disposed on bottom thereof and an inner connecting thread portion for screwing with an outer thread portion provided on said bottle head of said carbonated beverage containing bottle until a top end of said bottle head is pressed against a second sealing gasket provided inside said holding sleeve to ensure an airtight connection.

20. A device for preserving carbonation of carbonated beverage during consumption, as recited in claim 19, wherein said controller means further comprises an outer adjusting sleeve which top end is integrally connected to a top end of said valve rod to define a receiving ring groove therebetween, said outer adjusting sleeve having an inner threaded wall for screwing onto said outer thread portion of said controlling sleeve so as to connect said valve rod with said controlling sleeve, so that said valve rod is driven upwards to open said passage opening and downwards to airtightly close said passage opening by turning said adjusting sleeve about said controlling sleeve.

21. A device for preserving carbonation of carbonated beverage during consumption, as recited in claim 20, wherein another end of said airtight closed container provides a sealing means for selectively sealedly and airtightly closing said airtight closed container, said sealing means comprising an outlet having an outer thread portion provide thereon, a seal cap with an inner thread portion and a third sealing gasket positioned inside said seal cap, wherein by screwing said sealing cap to said outer thread portion of said outlet until a tip edge of said outlet pressing against said third sealing gasket to ensure airtight connection.

\* \* \* \* \*